United States Patent Office 3,128,149
Patented Apr. 7, 1964

3,128,149
PROCESS FOR PRODUCING CALCIUM TETRACUPROXY CHLORIDE
Herbert Baumgartner, Burghausen-Upper Bavaria, Germany, assignor to Wacker-Chemie G.m.b.H., Munich, Bavaria, Germany, a corporation of Germany
No Drawing. Filed Jan. 6, 1959, Ser. No. 785,122
Claims priority, application Germany June 30, 1958
2 Claims. (Cl. 23—85)

This invention relates to the production of calcium tetracuproxy chloride, and it has for its object to provide a novel and improved process for this purpose, avoiding the considerable loss of reactants inherent in the process of the prior art.

Another object of the invention is to provide an economical process for producing crystalline calcium tetracuproxy chloride.

Various other objects and advantages will be apparent as the nature of the invention is more fully disclosed.

The blue complex salt of calcium chloride and copper hydroxide known by the name of calcium tetracuproxy chloride, with the formula $CaCl_2 \cdot 4CuO \cdot xH_2O$, and used as a fungicide, is produced according to D.R.P. 677,439 by a process in which a solution of ammonium chloride and a great excess of calcium chloride is allowed to react upon metallic copper in the presence of air, whereby the ratio of calcium chloride to ammonium chloride is taken at about 10:1.

The above process has a number of faults in the technical performance. The necessarily high excess of calcium chloride compels the operation with large quantities of liquids. By separating the generated complex salt the calcium chloride of the mother liquor can be removed from the product only through a complex and repeated thorough washing process. The calcium chloride contained in the washing waters must therefore be considered lost. Even the loss in ammonium chloride is considerable, since intermediarily it participates in the reaction through the formation of water-soluble copper ammine salt, then reacts further while giving off ammonia, whereby a large part of the ammonia is blown out by the air. The recovery of this ammonia, which is in itself possible, would require closed containers and washing towers in place of the open vats described in said patent, which again would require a considerably higher apparatus outlay.

The process of the present invention avoids all these difficulties. Thus, I have found to my surprise that the same complex salt is formed, for the first time in crystalline form, when calcium hydroxide is allowed to react upon an aqueous suspension of copper oxychloride. The term copper oxychloride means the product with a mol ratio $CuCl_2:CuO=1:3$ applied generally, which is made by known processes.

With some hours of standing still, stirring, shaking or agitating such a suspension by oscillating same, its original light green color passes into a strong or intensive blue with simultaneous reduction of the free hydroxyl ions in the aqueous phase, until all the copper oxychloride has transformed into the calcium copper complex salt according to the equation:

$$CuCl_2 \cdot 3CuO \cdot xH_2O + Ca(OH)_2 = CaCl_2 \cdot 4CuO \cdot yH_2O$$

It is possible to operate with an excess of calcium hydroxide and to remove the unconverted $Ca(OH)_2$ by filtration and washing. It is preferable to use a stoichiometric quantity of calcium hydroxide according to the above equation and to neutralize out the final persistent trace of remaining alkalinity through the introduction of $CO_2$ or the addition of $H_2SO_4$. It is also possible, however, to proceed in such a manner that with a quantity smaller than required by the above equation calcium hydroxide is made to work. In this case there is obtained a product which has a correspondingly smaller calcium content, whereby it is possible to produce any optional color tone between green and blue.

The blue complex salt is obtained for the most part in well formed rhombic, almost square flakes and corresponds in its composition to about the mol relation Cu:Ca:Cl=4:1:2. The formation of the complex salt in flake or leaf form is a further advantage of this process, since in the application as a fungicide spraying or dusting medium on the plants it has because of this leafy structure excellent adhesibility and resistance to rain.

The product may be mixed, after pressing out in a suitable filter according to known methods, either with a suspension medium, for example, spent cellulose liquor, and dried in a spray dryer, or first dried, ground, and then mixed with the suspension medium and/or further additions, for example, surface active substances such as casein, soaps, polyvinyl alcohol, etc. for spraying or dusting media. It is further possible to produce with it mixtures with other fungicides and insecticides.

The following examples clarify the method of production.

Example 1

30 g. of copper oxychloride are suspended in 300 cu. cm. of water at 20° C., mixed with 50 cu. cm. of slaked lime, containing 8 g. $Ca(OH)_2$ and put on the shaking machine. The green suspension becomes colored to blue green and then to blue within 2 hours. Simultaneously the free hydroxyl ions in the aqueous phase are correspondingly diminishing. When diminishing has ended, the blue is drawn off with suction in fine tablet crystallized product form, washed free of alkali and dried. It corresponds in its composition to the formula:

$$CaCl_2 \cdot 4CuO \cdot 7-8H_2O$$

Example 2

15 g. copper oxychloride are suspended in 150 ml. $H_2O$, mixed with 2.5 g. $Ca(OH)_2$ and 0.3 g. $NH_4Cl$, and shaken with the shaking machine, as before. After 10 hours the entire suspension becomes deep blue. The washed-out and dried crystalline product contains 46.2% Cu, 7.0% Ca and 12.01% Cl, corresponding to a mol relation of Cu:Ca:Cl=4.16:1.0:1.93.

Example 3

30 g. copper oxychloride are suspended in 150 ml. $H_2O$, mixed with 5.0 g. $Ca(OH)_2$ and 7.9 NaCl, and placed on the shaking machine, as before. After 20 hours 35 g. of a greenish blue tablet-crystallized product of the composition of 46.8% Cu, 7.0% Ca, 13.8% Cl, are obtained, corresponding to a mol ratio of $$Cu:Ca:Cl=4.21:1.00:2.23$$

Example 4

3 kg. of copper oxychloride, containing 56.5% Cu, are suspended in 25 l. of water and mixed, while being stirred, with 500 g. calcium hydroxide. After 10 hours the original green color of the suspension has passed into an intensive blue. There are still 10.8 g. $Ca(OH)_2$ contained in the mother liquor. The alkaline suspension is then raised to a pH of 6–7 through the introduction of $CO_2$, then filtered off. The blue cake produced consists of rhombic, almost square flakes of 4–8µφ of the composition indicated in Example 1.

Example 5

A freshly produced wet filter cake of copper oxychloride which contains 274 kg. Cu is suspended in a rubberized stirring mechanism in 2.5 cu. m. of water at 9°

C., to which there are added 82.5 kg. technical calcium hydrate with a content of 97.7% Ca(OH)$_2$, and the aggregate stirred with the air excluded. 5 cu. cm. of the suspension consume after 1 hour 37.5 cu. cm. n/10 HCl, after 17 hours 20.8, after 21 hours 11.5, after 39 hours 1.4 cu. cm. The color of the suspension is after this time a clear blue.

The surplus calcium hydroxide is neutralized with sulfuric acid, then it is pressed off on the filter press and dried. 615 kg. of a blue product, predominantly crystallized into tablets of 4–8μφ are obtained, which contain upon analysis 44.2% Cu, 6.5% Ca and 11.5% Cl. This corresponds to a mol ratio of Cu:Ca:Cl=4.28:1.00:2.00.

The invention claimed is:

1. Process for producing crystalline calcium tetracuproxy chloride which comprises reacting calcium hydroxide at a temperature of about 9–20° C. and in the absence of ammonium ions with an aqueous suspension of copper oxychloride whose formula is $$CuCl_2 \cdot 3CuO \cdot 7\text{–}8H_2O$$

for at least 2 hours until the diminishing of the hydroxyl ions ceases, the proportion of said copper oxychloride to said calcium hydroxide being such that there is at least 1 Ca(OH)$_2$ for 4 Cu.

2. Process according to claim 1, in which the calcium hydroxide and copper oxychloride are used in stoichiometric proportions.

References Cited in the file of this patent

UNITED STATES PATENTS

| | | |
|---|---|---|
| 1,362,172 | Morselli | Dec. 14, 1920 |
| 2,302,103 | Carlson et al. | Nov. 17, 1942 |
| 2,358,706 | Haag et al. | Sept. 19, 1944 |
| 2,655,432 | Anderson | Oct. 13, 1953 |

FOREIGN PATENTS

| | | |
|---|---|---|
| 401,603 | Great Britain | Nov. 16, 1933 |
| 413,722 | Great Britain | July 11, 1934 |
| 425,395 | Great Britain | Mar. 13, 1955 |
| 648,140 | Germany | July 23, 1937 |

OTHER REFERENCES

Mellor: Comprehensive Treatise on Inorganic Chemistry, vol. 3, p. 178 (1923), Longmans, Green and Co.